US009010193B2

(12) United States Patent
Walther et al.

(10) Patent No.: US 9,010,193 B2
(45) Date of Patent: Apr. 21, 2015

(54) INERTIAL SENSOR HAVING AN OSCILLATING ROTATING DISK

(75) Inventors: Arnaud Walther, Grenoble (FR); Philippe Robert, Grenoble (FR)

(73) Assignee: Commissariat a l' energie Atomique et aux energies Alternatives, Paris (FR)

( * ) Notice: Subject to any disclaimer, the term of this patent is extended or adjusted under 35 U.S.C. 154(b) by 870 days.

(21) Appl. No.: 13/177,033

(22) Filed: Jul. 6, 2011

(65) Prior Publication Data
US 2012/0006123 A1  Jan. 12, 2012

(30) Foreign Application Priority Data
Jul. 7, 2010 (FR) ...................................... 10 55492

(51) Int. Cl.
G01B 7/16 (2006.01)
G01L 1/00 (2006.01)
G01C 19/5712 (2012.01)

(52) U.S. Cl.
CPC .................................. *G01C 19/5712* (2013.01)

(58) Field of Classification Search
USPC .................................................... 73/774, 778
See application file for complete search history.

(56) References Cited

U.S. PATENT DOCUMENTS

| | | | | |
|---|---|---|---|---|
| 5,955,668 A * | 9/1999 | Hsu et al. | .................... | 73/504.12 |
| 6,244,111 B1 * | 6/2001 | Funk | .......................... | 73/504.13 |
| 6,308,567 B1 * | 10/2001 | Higuchi et al. | ............ | 73/504.12 |
| 6,321,598 B1 | 11/2001 | Iwaki et al. | | |
| 6,349,597 B1 * | 2/2002 | Folkmer et al. | ............ | 73/504.02 |
| 6,393,913 B1 * | 5/2002 | Dyck et al. | ................. | 73/504.12 |
| 2008/0314148 A1 | 12/2008 | Robert | | |
| 2009/0139342 A1 * | 6/2009 | Robert et al. | .................. | 73/818 |

FOREIGN PATENT DOCUMENTS

EP  2 008 965 A2  12/2008
EP  2 065 713 A1  6/2009

OTHER PUBLICATIONS

U.S. Appl. No. 13/722,427, filed Dec. 20, 2012, Walther.

(Continued)

*Primary Examiner* — Lisa Caputo
*Assistant Examiner* — Jamel Williams
(74) *Attorney, Agent, or Firm* — Oblon, McClelland, Maier & Neustadt, L.L.P.

(57) ABSTRACT

The present invention relates to an inertial rotary movement microsensor for detecting a rotational movement around what is referred to as an axis of rotation (X), provided with a part that is movable relative to a fixed part, the movable part comprising an excitation mass configured to undergo an oscillating movement in an excitation direction (Z) by an exciter so as to generate a Coriolis force induced by the rotational movement, a detection mass kinematically connected to the excitation mass by a linkage configured to transmit the Coriolis force at least partly without transmitting the oscillating movement around the excitation axis at least partly, a detector configured to measure the Coriolis force transmitted to the detection mass, characterized in that the detector is provided with at least one strain gauge suspended between the detection mass and an anchoring part integral with the fixed part.
Application to the technologies known as MEMS.

25 Claims, 10 Drawing Sheets

(56) References Cited

OTHER PUBLICATIONS

French Preliminary Search Report and Written Opinion issued Feb. 21, 2011, in French 1055492, filed Jul. 7, 2010 (with English Translation of Categories of Cited Documents).

Ph. Robert, et al., "M&NEMS: A new approach for ultra-low cost 3D inertial sensor", IEEE Sensors 2009 Conference, Oct. 2009, XP031618603, pp. 963-966.

* cited by examiner

INERTIAL SENSOR HAVING AN OSCILLATING ROTATING DISK

FIELD OF THE INVENTION

The present invention relates in general to inertial sensors of gyroscope or gyrometer type and more particularly to those referred to as oscillating and capable of detection, in one or more axes, the very small Coriolis forces caused by the rotational motions to which these sensors are subjected.

PRIOR ART

For a long time the manufacture of inertial sensors of gyroscope or gyrometer type at very low cost has relied on all the technologies employed during past decades by the microelectronics industry for the mass production firstly of integrated circuits and then of electromechanical microsystems. These micro systems are better known by the acronym MEMS for the English "Micro Electro-Mechanical Systems". Based substantially on the use of silicon because of its semiconductor properties, and also because of its mechanical properties in the case of the MEMS, the use of these technologies has led to the manufacture of what are known as planar inertial sensors. Manufactured from one substrate, they are effectively formed in a single plane, on the surface thereof, using means and methods of the microelectronics technologies, especially deposits or growth of diverse materials in multiple layers, photolithography to define the patterns, and engraving of these patterns.

Very numerous methods and structures for planar inertial sensors have been proposed. U.S. Pat. No. 5,955,668 is characteristic of the type of sensors that may be produced using microelectronics technologies. Composed of two planar masses, the Coriolis forces are transmitted to an inner disk whose balancing around an anchoring axis must be detected to measure the characteristics of the rotation to which the sensor is subjected (amplitude, velocity, etc.).

The precision of detection of Coriolis forces, which are weak, is a paramount quality factor for these sensors. Traditionally, for the type of planar sensors described by the above patent, the measurement of the balancing and in general of the movement or deformation of the part of the sensor subjected to Coriolis forces in other similar applications is determined by measuring the variation of electrical capacitance between the moving electrodes. This measurement of a very small capacitance, with even smaller variations, is very difficult to achieve with precision. The values become even smaller with increasing miniaturization of the sensors. Furthermore, the movements to be detected are generally out of plane, thus complicating the placement and construction of the electrodes of the capacitive element to be measured. In addition, numerous factors are capable of perturbing the measurement: parasitic movements induced by the excitation system of the sensor (oscillation of a first mass intended to create the angular kinetic momentum); electrical coupling that may exist between two or even three detection channels.

It is therefore one object of the invention to improve the planar inertial sensors of the type described hereinabove in order to maintain and even enhance their sensitivity and/or their simplicity of use even though their miniaturization is ever more extensive.

SUMMARY

For this purpose, one aspect of the invention relates to an inertial rotary movement microsensor for detecting a rotational movement around what is referred to as an axis of rotation, provided with a part that is movable relative to a fixed part, the movable part comprising an excitation mass configured to undergo an oscillating movement around what is referred to as an excitation axis by an exciter so as to generate a Coriolis force induced by the rotational movement, a detection mass kinematically connected to the excitation mass by a linkage configured to transmit the Coriolis force at least partly without transmitting the oscillating movement around the excitation axis at least partly and having one degree of freedom in rotation around what is known as an oscillation axis, perpendicular to the axis of rotation, a detector configured to measure the Coriolis force transmitted to the detection mass. The detector is provided with at least one strain gauge suspended between the detection mass and an anchoring part integral with the fixed part.

Preferably but not exclusively, at least one of the strain gauges is a piezoresistive gauge.

By "suspended" it is understood that the gauge or gauges is connected at its two ends or close to these ends, while at least part of its length remains free and without contact with one or other of the detection element and of the fixed part. The gauge referred to as "suspended" is maintained in two parts referred to as end parts. The part of the gauge, referred to as central part, disposed between these two end parts has non-zero length and is not in contact with any other movable or fixed element, and especially any of the elements among those composing the sensor.

Another aspect of the invention relates to an inertial rotary movement microsensor for detecting a rotational movement around what is referred to as an axis of rotation (X), provided with a part that is movable relative to a fixed part, the movable part comprising an excitation mass configured to undergo an oscillating movement around what is referred to as an excitation axis (Z) by an exciter so as to generate a Coriolis force induced by the rotational movement, a detection mass kinematically connected to the excitation mass by a linkage configured to transmit the Coriolis force at least partly without transmitting the oscillating movement around the excitation axis (Z) at least partly and having one degree of freedom in rotation around what is known as an oscillation axis (Y), perpendicular to the axis of rotation (X), a detector configured to measure the Coriolis force transmitted to the detection mass, wherein the detector is provided with at least one strain gauge suspended between the detection mass and an anchoring part integral with the fixed part, an additional mass connected to the excitation mass so as to exhibit a vibration movement in a direction perpendicular to the excitation axis (Z) and so as to generate a Coriolis force induced by a rotational movement of the additional mass in the excitation axis (Z) and an additional detector configured to measure the Coriolis force induced by a rotational movement of the additional mass in the excitation axis (Z).

BRIEF DESCRIPTION OF THE FIGURES

The purposes, objects, as well as the characteristics and advantages of the invention will become more apparent from the detailed description of embodiments thereof, which may be combined and are illustrated by the following non-limitative accompanying drawings, wherein.

Figure 1:
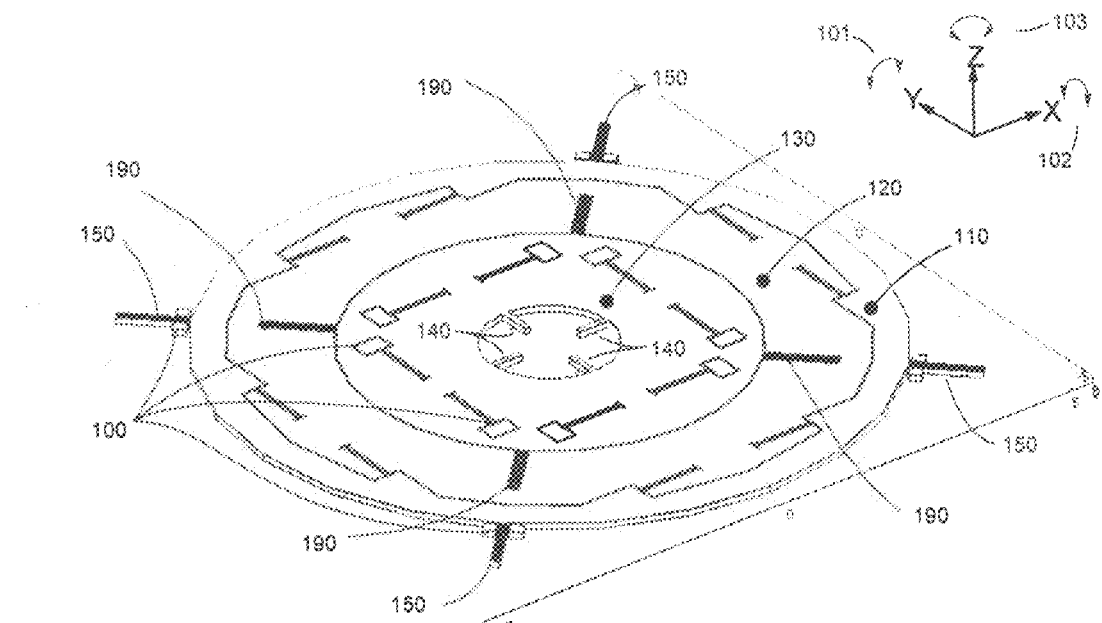
FIG. 1 illustrates a first embodiment in which an inertial sensor according to the invention is composed of three separate masses, which permit detection of Coriolis forces generated in two orthogonal axes of rotation with the aid of piezoresistive gauges.

The attached drawings are provided by way or examples and are not limitative of the invention.

DETAILED DESCRIPTION

The sensor of the invention is provided with a fixed part, such as part of a substrate employed in the MEMS technologies. Another part, referred to as movable part, is mounted relative to the fixed part so as to preserve freedoms of movement, which will be described in detail hereinafter. The movable part forms the portion of the sensor where a pseudo Coriolis force is created under excitation condition in the case of rotation in an axis where it is desired to achieve detection.

In general, the axis of the rotational movement to be detected is referred to as axis of rotation. Detection employs an oscillating movement around an excitation axis. The operation of the sensor generates a tendency to cause an induced rotational movement around an axis used for detection. Here it is generally referred to as oscillation axis and is perpendicular to the axis of rotation of the movement to be detected.

For detection in an axis of rotation (X, for example), the excitation axis is denoted (Z) and the oscillation axis is the (Y) axis. For a movement to be detected in the (Y) axis, the excitation axis is (Z) and the oscillation axis is the (X) axis. The strain gauge is used to detect the rotation around the oscillation axis.

In the examples to follow, an organ of the movable part is an excitation element in the form of a first mass undergoing an excitation. Another organ is a detection element in the form of another mass. A preferred embodiment of the invention associates a third intermediate mass with the foregoing masses, although this case is not limitative.

Before beginning a description of preferred embodiments, advantageous variants of the invention are briefly introduced below before being described in detail in the following embodiments:

Preferably the gauge has elongated shape in one direction and its length, referred to as gauge length, is large in this direction (compared with each dimension measured in a section perpendicular to the said direction). It is maintained at two end parts, which are each of short or very short length compared with the length of the gauge or of its central part. These two end parts may simply be the borders of the gauge.

The gauge may have the form of a beam or spoke, for example of rectangular or square section, whose thickness is oriented in the excitation axis.

If several gauges are employed, they may or may not be identical. Preferably, at least one of them has the characteristic form and/or orientation corresponding to one of the embodiments described here.

This choice of advantageously piezoresistive gauges associated with a specific layout configuration, of suspension type, leads to advantageous results in terms of detection.

Advantageously, the fixed part is provided with a substrate from which all or part of the movable part is constructed, and the strain gauge extends in a plane parallel to the plane of the substrate, in a direction parallel to the axis of the rotation to be measured but orthogonal to that of the movement of the detection mass. In this way the position of the gauge can be best adjusted for optimum detection. Furthermore, the Coriolis force is induced by a rotational movement situated in the plane of the substrate.

Furthermore, the detection mass is advantageously superposed on the fixed part in the excitation axis and is provided with an inside face opposite one face of the fixed part, the gauge being located in the extension of the inside face. According to these cases, the gauge can easily be integrated with the rest of the sensor during manufacture, especially via a thin layer in which the gauge is formed during the lithography steps.

Preferably the sensor is provided with an intermediate movable mass connected to the excitation mass so as to be subjected at least partly to the oscillating movement around the excitation axis of the excitation mass and to the Coriolis force, and connected to the detection mass so as to transmit the Coriolis force at least partly and to be movable in rotation integrally with the detection mass according to the oscillating movement generated by the Coriolis force. This optimized decoupling permitted by this intermediate mass limits the parasitic strains that could be imposed on the gauge. In this way the risks of rupture are reduced, and it is possible to refine the gauge so as to concentrate the strains on its cross section, which is reduced, with the result that the sensitivity is increased.

Other optional characteristics capable of being accumulated or used alternatively are cited hereinafter. In particular, certain advantageous aspects relate to the location of the gauge or gauges in order to optimize the detection. The micro sensor may therefore be such that:

at least one strain gauge is a piezoresistive gauge, the at least one strain gauge is connected to the detection mass at a height level, in the excitation axis, different from that of the oscillation axis of the detection mass, the fixed part is provided with a substrate, from which all or part of the movable part is constructed, the strain gauge extending in a plane parallel to the plane of the substrate, in a direction parallel to the axis of rotation, the detection mass is superposed on the fixed part in the excitation axis and is provided with an inside face opposite one face of the fixed part, the strain gauge being located in the extension of the inside face, an intermediate movable mass is connected to the excitation mass so as to be subjected at least partly to the oscillating movement around the excitation axis and to the Coriolis force, and connected to the detection mass so as to transmit the Coriolis force at least partly and to be movable in rotation integrally with the detection mass in its oscillation axis, the strain gauge is suspended from the anchoring part integral with the fixed part by way of an individual electrical contact, the detection mass is provided with a hole, at the position of which there is suspended the at least one strain gauge, the detection mass exhibits axial symmetry in the excitation axis, the hole being located at the center of the detection mass, the detection mass is provided with a series of beams provided with at least one beam projecting toward the inside of the hole and to which the strain gauge is connected, the beam is oriented in the oscillation axis of the detection mass, the detection mass is provided with a second strain gauge connected to the beam in symmetrical relationship with the first strain gauge relative to the oscillation axis of the detection mass, the series of beams includes a second beam to form a pair of beams comprising at least one strain gauge connected to the second beam, the said second beam and the said at least one gauge being symmetric respectively relative to the first beam and to the at least one strain gauge connected to the first beam, in the axis of symmetry of the detection mass, the excitation mass and the detection element are configured to generate and transmit a second Coriolis force induced by a rotational movement around a second axis of rotation perpendicular to the axis of rotation, the micro sensor being provided with a second detector configured to measure the second Coriolis force transmitted to the detection mass, the detection mass having one degree of freedom in rotation around a second axis referred to as oscillation axis, the intermediate mass has one degree of freedom in rotation around the second axis referred to as oscillation axis, the detection mass is provided with a second series of beams turned by 90° relative to the first series of beams around the point of intersection of the first and second oscillation axes of the detection mass, and the second detector is provided with piezoresistive gauges turned by 90° relative to the piezoresistive gauges of the first detector around the point of intersection of the first and second oscillation axes of the detection mass, the excitation mass surrounds the detection mass, the additional mass has two parts constructed symmetrically relative to the excitation axis, the additional detector cooperating with the two parts of the additional mass to achieve a differential measurement of the Coriolis force induced by the rotational movement of the additional mass in the excitation axis, each part of the additional mass is provided with a portion configured to be subjected to the vibration movement and a portion anchored to the fixed part so that it is not subjected to the vibration movement, the two parts being connected by an arm, the additional detector being provided with at least one strain gauge on each arm, the device consists of a micro electromechanical system, the at least one strain gauge comprises a deposit of electrically conductive material having piezoresistive properties, the deposit of material is obtained by engraving in a layer of material, and at least one electrically conductive organ is also obtained by engraving in the said layer of material, FIG. 1 illustrates a first embodiment of the invention in which an inertial sensor is composed of three separate seismic masses permitting detection of Coriolis forces generated in two orthogonal axes of rotation of the sensor and being situated in the plane of the substrate. The arrangement of the three masses with use of suspended piezoresistive gauges assures complete decoupling of the oscillating excitation movements of the sensor, which are not transmitted to the gauges, so that they are able to measure precisely only the compression and extension (or traction) movements to which they are subjected by the Coriolis forces resulting from rotations of the sensor in the two possible detection axes.

FIG. 1 is a perspective view of the planar inertial sensor of this first embodiment of the invention. The different movements of the three masses of the sensor are described hereinafter on the basis of the traditional three-dimensional frame of reference, in which the plane of the sensor is defined here by the axes denoted X and Y. The third dimension, out of the plane, is the Z axis. The kinetic excitation energy is communicated to the sensor in the form of oscillations in the XY plane, around the Z axis, as indicated at reference 103. The excitation element is a first mass that receives this excitation by traditional means, an example of which is given below. In this example, the first mass has the form of an outer ring 110, which is made free to oscillate in the single plane XY around the Z axis via springs 150, here four in number. Springs 150 are designed to give the first mass a single degree of freedom of movement in rotation around the Z axis 103. Relative to the fixed part, these springs are described more precisely in FIG. 4.

The oscillating excitation movement of the sensor is transmitted to intermediate ring 120 constituting another mass. It is rigidly connected to the outer ring via the excitation movement and therefore also has a movement around the Z axis. However, springs engraved in the plane of the intermediate ring, described hereinafter, endow it with two supplementary degrees of freedom of movement in oscillation around the X and Y axes, 102 and 101 respectively.

Another mass, in the form of central ring 130, is in turn anchored in rotation relative to Z and therefore cannot follow the oscillating excitation movements communicated to outer and intermediate rings 110 and 120. Therefore it can be sensitive only to the movements resulting from the Coriolis forces and for this purpose therefore has two degrees of freedom of movement in oscillation around the X and Y axes with the means described in the following figures; the movements due to the Coriolis force are transmitted by springs 190. Central ring 130 and outer ring 110, which are not free in all their movements, have anchoring points on a fixed substrate, some of which are denoted by 100 in FIG. 1. They are described and indicated more precisely hereinafter.

The strain movements are transmitted to the piezoresistive gauges, here by four beams 140 disposed on the inside periphery of central ring 130, thus forming an element for detection of oscillations in the X and Y axes at a hole 147.

Preferably, the thickness (in the Z direction, but preferably also the width orthogonal to the direction of the rotational movement to be detected) of the gauge or gauges is between a multiple of 10 nm and several micrometers, for example 1 µm or 2 µm or 10 µm. An example of thickness is 40 nm for a strain gauge suspended in crystalline silicon. Preferably, the thickness e is very small compared with d (e<<d, or e<d/10 or e>d/20), where d is the distance between the oscillation axis of detection mass 130, 230 in the direction of the rotational movement as illustrated at reference 148 in FIG. 7 and its lower plane opposite the substrate.

For each pair of gauges, the differential measurement can be made by means of a Wheatstone bridge.

Figure 2:
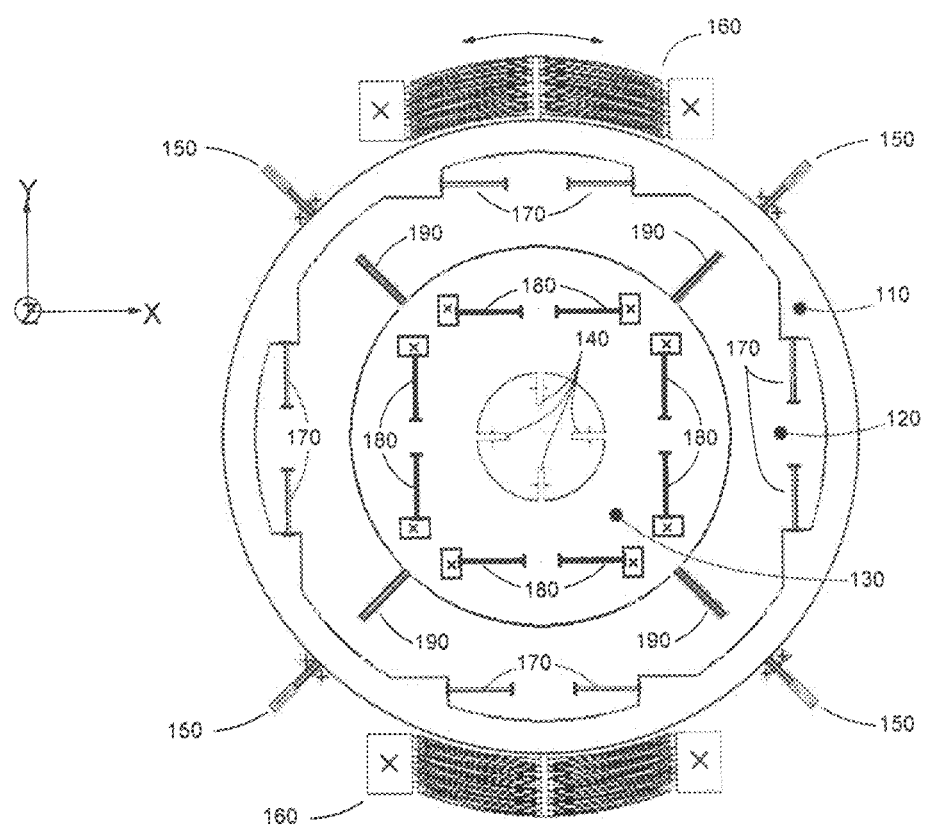
FIG. 2 is a plan view of an inertial sensor with three seismic masses according to the invention.

FIG. 2 is a view in the XY plane of the inertial sensor with three seismic masses according to FIG. 1. This figure also shows the three masses in the form of concentric rings 110, 120 and 130 described hereinabove. In this example, the oscillating movement is communicated to outer ring 110 by a set of two electrostatic actuating combs 160. The movement is traditionally obtained by application of a d.c. voltage between the two combs, upon which d.c. voltage there is superposed an alternating voltage corresponding to the desired excitation frequency of the inertial sensor, in order to communicate thereto the necessary kinetic energy to permit the development of Coriolis forces when the sensor itself is set in rotation. Typical usable frequencies are 2-20 kHz, the voltages varying according to the quality factor: for a quality factor equal to a multiple of 1000 (corresponding to a primary vacuum), voltages on the order of several volts are sufficient, while for very high quality factors, such as 50000-200000 (very high vacuum), voltages of 10-100 mV are advantageous.

Figure 3:
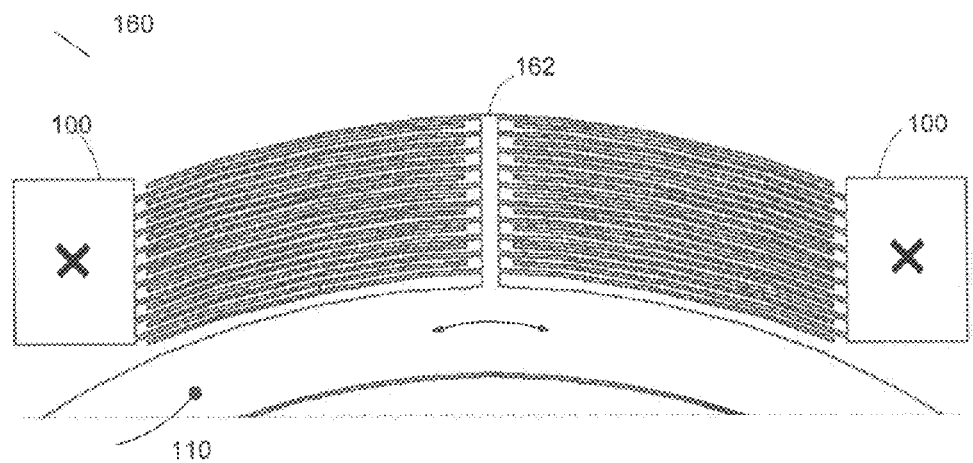
FIG. 3 shows an enlarged view of a set of electrostatic actuating combs serving to communicate an oscillating excitation movement to an outer ring constituting the first mass of the sensor.

All the anchoring points on a fixed part of the sensor or substrate are indicated in the form of a cross in this figure. One half of the combs, four in this example, are fixed and anchored to the substrate. The other half of the combs is integral with the outer ring in order to communicate the oscillating movement thereto. FIG. 3 shows an enlarged view of these combs with their anchoring points 100 and outer ring r110 integral via part 162 with two movable combs.

Figure 4:
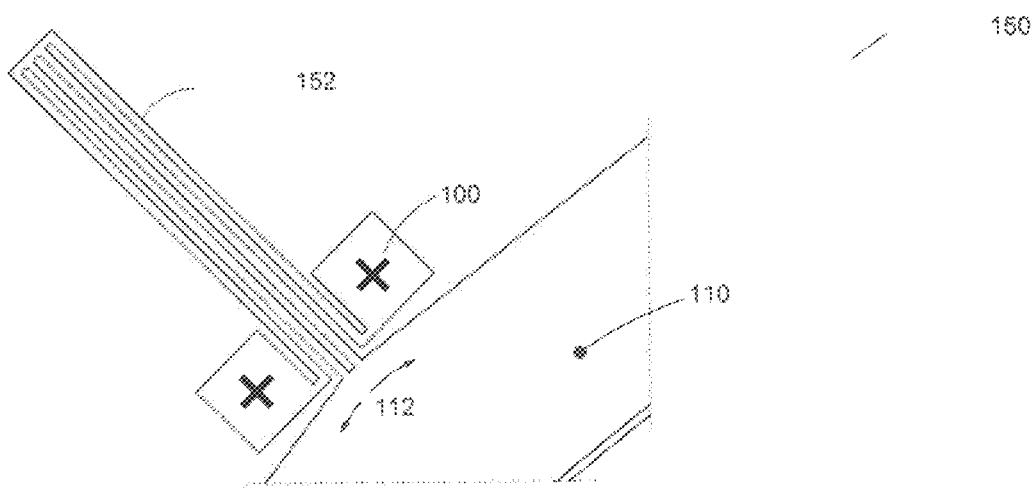
FIG. 4 is an enlarged plan view of a spring permitting the oscillating excitation movement of the outer ring.

The other anchoring points indicated in FIG. 2 are those of springs 150, which assure the freedom of oscillating movement in the XY plane around the Z axis for the first of the masses of the sensor, or in other words outer ring 110. FIG. 4 is an enlarged view of one of these springs in the XY plane. Two anchoring points 100 are situated on both sides of each of springs 150. The only freedom of movement of the outer ring around the Z axis is obtained by constructing long flexible fingers 152, which are anchored on the one hand on the substrate and on the other hand are integral with the outer ring 110 permitting an oscillating movement 112, whose amplitude is typically several microns ($10^{-6}$ meters). As can be seen in the perspective view, springs 150 are thick and therefore also rigid, in order that they cannot be deformed in a direction other than that for which they were designed, or in other words in order that they permit only rotation in the XY plane around the Z axis.

FIG. 2 also shows all the springs 170 linking the first and the second mass, that is to say, in this example, outer ring 110 and intermediate ring 120. The eight springs here have the role, as already mentioned in the foregoing, of transmitting the excitation movement to the intermediate ring while nevertheless permitting it to acquire two additional degrees of freedom in oscillation around the X and Y axes. For this purpose, one half, or four in this example, are disposed in the direction of the X axis and the four others are disposed in the direction of the Y axis. These springs are therefore rigid in the XY plane and flexible out of plane, or in other words in the Z axis.

Figure 5:
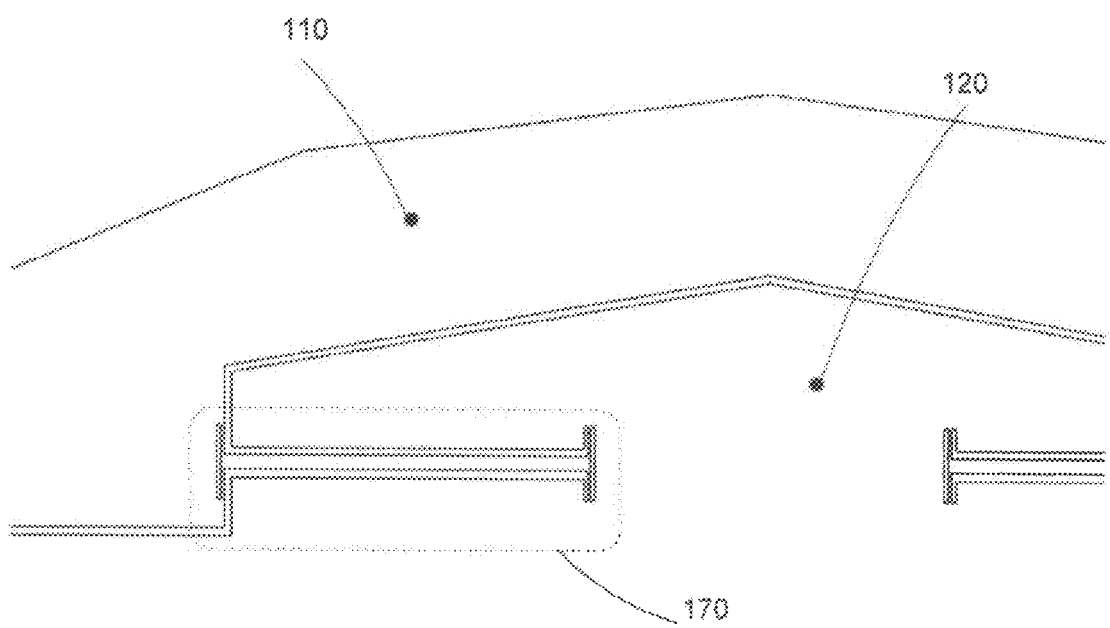
FIG. 5 is an enlarged view of the linkage with one of the springs intended to transmit the oscillating movement around the excitation axis to an intermediate ring constituting the second mass of the sensor.

FIG. 5 is an enlarged view of one of these springs 170 designed to transmit the oscillating movement around the Z axis to intermediate ring 120 while permitting this ring to be subjected to the Coriolis forces and also allowing a deformation movement orthogonal to the XY plane in which they are represented, forces appearing when the sensor itself is subjected to rotation around the X axis, around the Y axis or around both at the same time, by virtue of movements of the device in which it is integrated. It is those movements that are to be detected with the sensor.

FIG. 2 also shows springs 190 assuring the link between the second and the third of the three masses of an inertial sensor according to this first embodiment. These springs, intended to transmit only the movements resulting from Coriolis forces to the third mass, are flexible in the XY plane and rigid out of plane, in Z, just as those 150 of the outer ring. They are therefore constructed in a manner identical to that shown in FIG. 4.

In general, between outer ring 110 constituting the excitation element and the third mass constituting the detection element, a link assures this selective transmission between the two elements. In the embodiment described here, an intermediate ring 120 participates in the link so as to achieve improved decoupling between the excitation element and the detection element, the objective being that the Coriolis force will be transmitted at least partly without perturbation of detection by additional movements or forces.

Here, the third of the seismic masses, constituted by central ring 130, is anchored on the substrate and cannot move around the Z axis. In this exemplary embodiment of the invention, there are eight anchoring points distributed as indicated by the eight corresponding crosses. The central ring is linked to these anchoring points by springs that are rigid in the XY plane and flexible in the Z axis. The central ring therefore has only two degrees of freedom in rotation around the X and Y axes, so that, by way of four inner fingers 140, it transmits to the piezoelectric gauges only the movements caused by the Coriolis forces that are developed when the sensor is subjected to rotations in these two X and Y axes.

Figure 6:
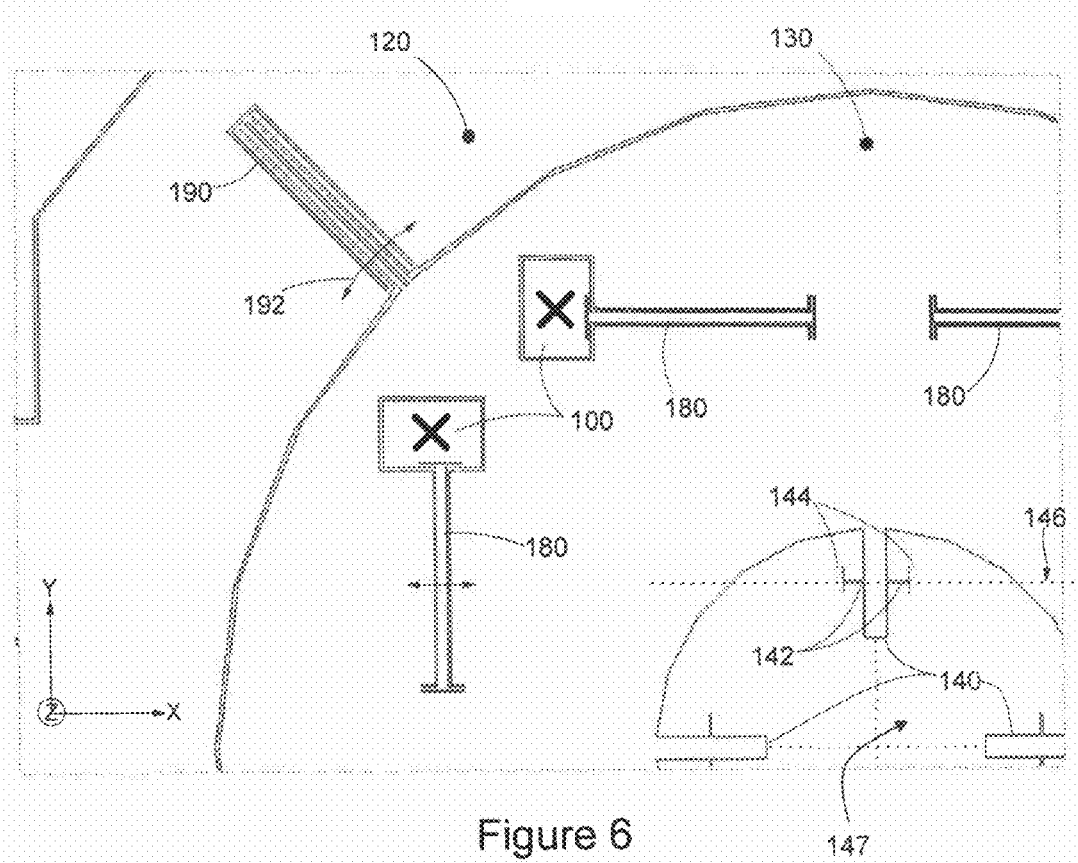
FIG. 6 is an enlarged view of part of a central ring constituting the third mass of the sensor, of its linkages with the intermediate ring and of its anchoring points.

FIG. 6 is an enlarged view of part of central ring 130 and of its links 190 with intermediate ring 120. Anchoring points 100 of central ring 130 and the presence of springs 190 prevent the transmission of oscillating movements 192 in the XY plane from the intermediate ring. The third seismic mass, or in other words central ring 130 functioning as detection element, therefore has only two degrees of freedom in rotation around the X and Y axes.

Suspended strain gauges 142 are connected on one side to lower beams 140 integral with central ring 130 and on the other side are anchored on substrate 144 situated in the fixed part and on an individual contact pad permitting measurement of the electrical resistance of each gauge. The gauges are made of a piezoresistive material. Silicon, which is the base material for the construction of MEMS, is suitable. The placement of the gauges is discussed in the following figure.

Figure 7:
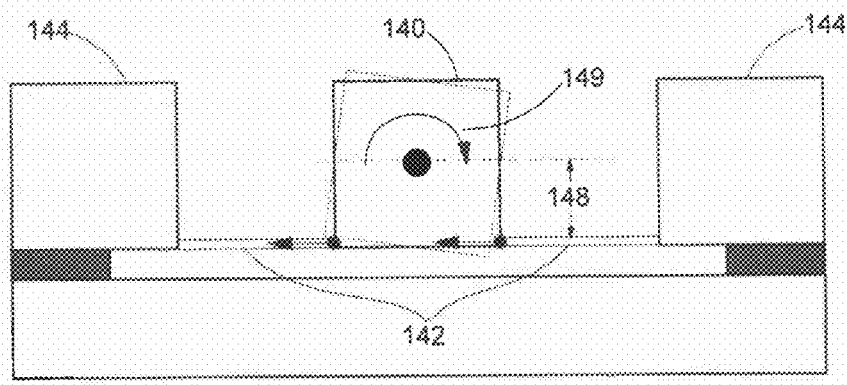
FIG. 7 is a view in section of a pair of piezoresistive gauges intended to measure the Coriolis forces.
Figure 8A:
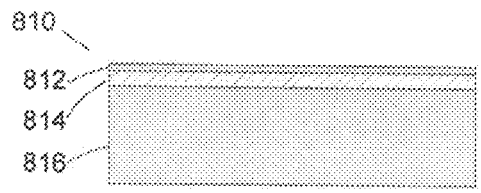
FIGS. 8a to 8g describe the main steps of a method for producing MEMS compatible with the manufacture of inertial sensors according to the invention.
Figure 8B:
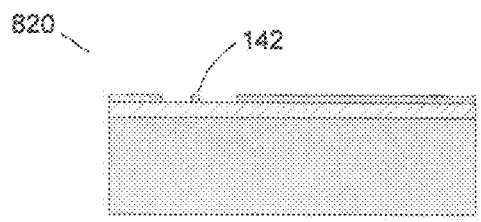
Figure 8C:
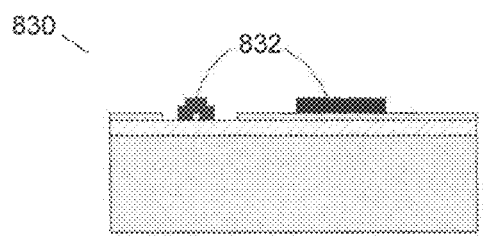
Figure 8D:
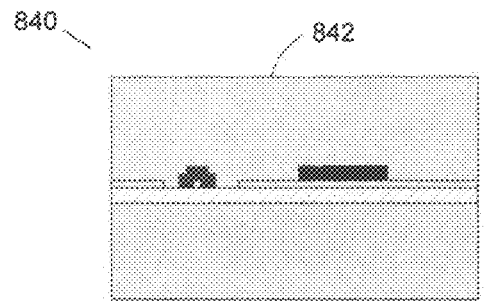
Figure 8E:
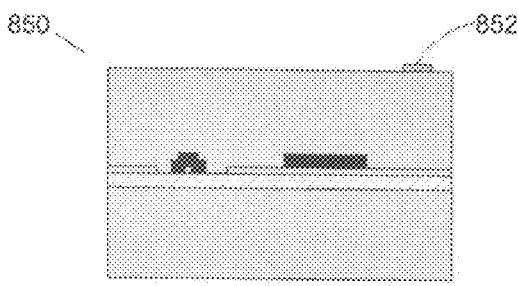
Figure 8F:
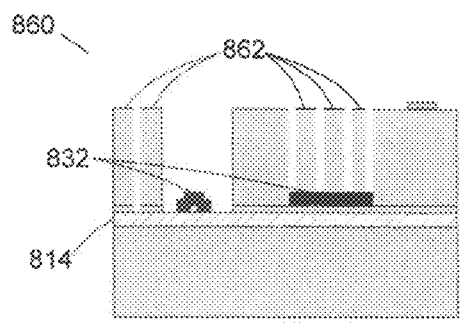
Figure 8G:
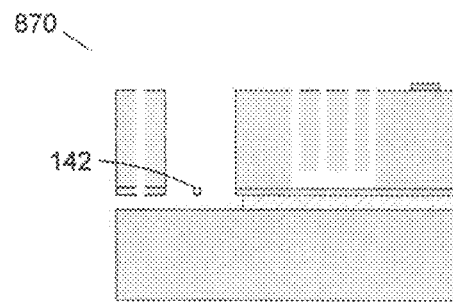

FIG. 7 is a sectional view, for example through axis 146 in FIG. 6, of a pair of piezoresistive gauges. This pair of gauges is advantageously used in differential mode, thus making it possible to be uninfluenced by identical parasitic deformations that would affect the two strands 142, in order to achieve a better measurement of the opposed variations of resistance due to the compression of one strand and the extension of the other because of the rotation of finger 140 under the action of Coriolis forces transmitted to central ring 130 and to the inner beams.

The position of the gauges has an offset 148 in the Z axis relative to axis of rotation 149 of the third mass, the central ring. Axis of rotation 149 is at the middle of the thick layer constituting the oscillating part. Offset 148 produces a lever arm that amplifies the oscillating movement. In the case of a rotation, for example around the X axis, the Coriolis force induced in the third mass generates a tensile/compressive strain in the gauges oriented in the X axis, due to an oscillation of the detection masses in the Y axis.

The piezoresistive gauges preferably have the thinnest possible section. Typically they have a section on the order of smaller than one micron, in order to have the highest possible strain concentration in the gauge and thus amplify the piezoresistive effects.

It is advantageous to position the gauges with a view to minimizing the interferences between the axes of rotation, whose detection effects should ideally remain independent. When a rotation is detected, for example around X, the inertial sensor (or more precisely the detection mass or masses) oscillates around the Y axis and exerts tension/compression on the gauges associated with this detection axis. The tensile/compressive strain on these gauges causes a modification of their resistivity, which makes it possible to revert to Coriolis force. However, during this movement, the gauges associated with detection of rotations around Y may be subjected to a vertical movement if they are not at the center of the structure (the movement is a torsional movement only if beams 140 are perfectly at the center). This vertical movement deforms them in flexion, which may have a slight effect on the variations of resistivity of the gauge. In addition, the gauges are deformed in the same manner in flexion, although they are deformed in differential manner during detection of a rotation. The Applicant has noted that it is advantageous to position them as close to the center as possible in order that this parasitic deformation in flexion:

does not compromise the integrity of the gauge, which may break in case of excessive deformation;

generates the smallest possible parasitic signal;

has the most limited effect possible on the sensitivity when it is necessary to detect components of rotation in the two axes.

Finally, the gauges are also preferably disposed in differential and symmetric manner relative to the axes of rotation of the detection modes. This is done so that the stiffness of gauges associated with one axis does not asymmetrically perturb the detection movement in the other axis, which would lead to coupling between modes and interference between axes.

To minimize the deformation of the gauges in flexion, it may be worthwhile to slave the inertial sensor in detection. This does not eliminate the problem of interference between axes, but it reduces the risks of breakage and of non-linear behavior.

FIGS. 8a to 8g describe the main steps of a method for constructing MEMS compatible with the manufacture of inertial sensors according to the invention. The steps of the method potentially employ all the known techniques (photolithography, engraving, deposition of materials of all kinds, etc.) and manufacturing methods developed by the microelectronics industry for the manufacture of integrated circuits and electromechanical devices of MEMS type.

The starting material is a composite substrate 810 referred to as SOI for the English "silicon on insulator", provided at the surface with a thin layer of single-crystal silicon 812 insulated by an oxide layer 814 of substrate 816. This type of composite substrate is often used for the manufacture of MEMS.

The following step 820 consists in engraving what is known as the thin part of the sensor in single-crystal silicone layer 812. It is in this layer that piezoelectric gauges 142 in particular are constructed.

In the following step 830, oxide is deposited and patterns 832 are engraved to act as protection during the operations of liberation of the movable parts of the MEMS described hereinafter.

In step 840, a thick epitaxial deposit of silicon is formed to obtain layer 842, in which the fixed and movable parts of the sensor will be constructed.

In step 850, a metal such as aluminum is deposited, thus making it possible, after engraving, to form all the necessary electrical interconnections 852.

Deep engraving of the silicon is then performed in step 860, thus making it possible, in thick layer 842, to define movable parts 862, especially the three masses of the inertial sensor of the invention with its springs. Engraving is performed until it is stopped on an oxide layer. For example, on protective patterns 832 defined previously in step 830. Oxide layer 814 of the SOI substrate also acts as a stopping layer where no protective pattern has been formed.

The liberation of the movable parts is performed in the following step 870, by dissolving the parts of the oxide layers referred to as sacrificial layers, where they have become accessible after the deep engraving. In this way there is obtained the represented structure in which the movable parts are liberated (underlying oxide is no longer present). Suspended piezoresistive gauges 142 made in thin layer 812 are also liberated, so that they can be subjected to tension/compression by the third mass, central ring 130 of the sensor, as explained in the foregoing.

Figure 9A:
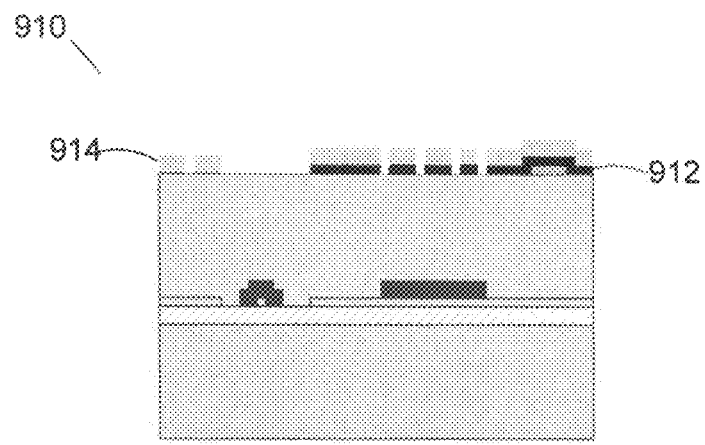
FIGS. 9a to 9c describe the supplementary steps of a method for producing MEMS which make it possible to obtain different thicknesses for production of mechanical parts.
Figure 9B:
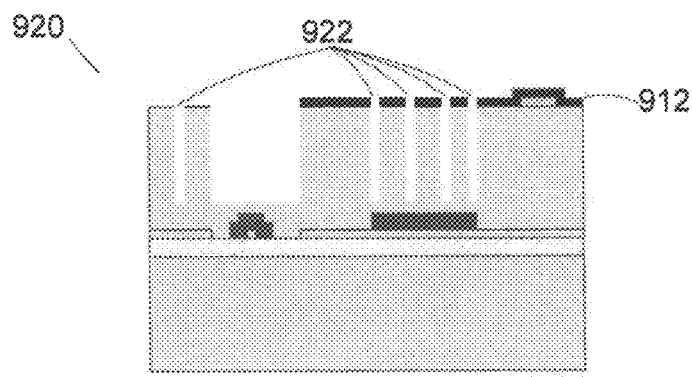
Figure 9C:
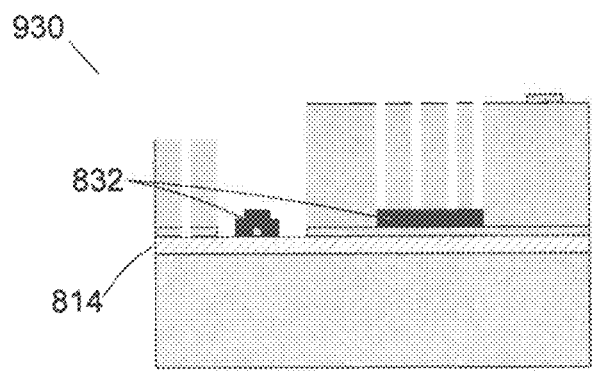

FIGS. 9a to 9c describe the supplementary steps of a method for constructing the sensor that make it possible to obtain different thicknesses for the construction of mechanical parts. This may be advantageous, for example, for adjusting the rigidity of the springs described in the foregoing.

In step 910, which follows step 850 of FIG. 8, two different thicknesses are obtained in the thick layer in which the mechanical parts are constructed by depositing and defining at the surface a hard mask 912, by means of lithography and engraving of an appropriate material, such as silicon oxide. During a first step 920 of deep engraving of patterns 922, resin 914 is used as protection for the parts of the mechanism, whose thickness must not be reduced. During a second step of deep engraving 930, after removal of resin mask 914, deep engraving through hard mask 912 is ended with stopping on oxide layers 832 and 814 as in step 860 of FIG. 8. In this way, two different thicknesses of the mechanical parts are obtained in this example. Obviously more than two thicknesses may be constructed by repeating the foregoing steps.

In the foregoing description of methods for producing a sensor according to the invention, reference is made only to the use of silicon layers. When the gauges are piezoresistive, however, any material of conductor or semiconductor type having piezoresistive properties may be used for thin layer 812. As an example, a silicon/germanium (SiGe) compound may be used in addition to silicon (Si). These materials may be used in single-crystal or polycrystalline form. For thick layer 842, potentially any type of conductor or semiconductor material may also be employed. The thick layer may be deposited by any type of deposition means employed in microelectronics, and not only by epitaxy as indicated hereinabove. The materials used for the thin layer and the thick layer may be different.

The protective material of the thin layer and that of the sacrificial layer under the thin layer indicated hereinabove is most often silicon dioxide ($SiO_2$). Other materials may be used. They must be capable of being engraved selectively relative to the materials of the thin and thick layers, and preferably the deep engraving of thick and thin layers must be selective relative to this sacrificial material.

As is seen in FIGS. 8 and 9, thin layer 812 may be used not only to produce piezoresistive gauges as explained in the foregoing but also optionally to form other electrically conductive means/organs of the sensor. Layer 812 may also be employed

- as an electrically conductive level passing under the movable parts;
- as a horizontal capacitive electrode capable of functioning for employment of a counter-reaction electronic circuit or in order to adjust the resonance frequency of the seismic masses or in order to permit capacitive detection out of plane.

Figure 10A:
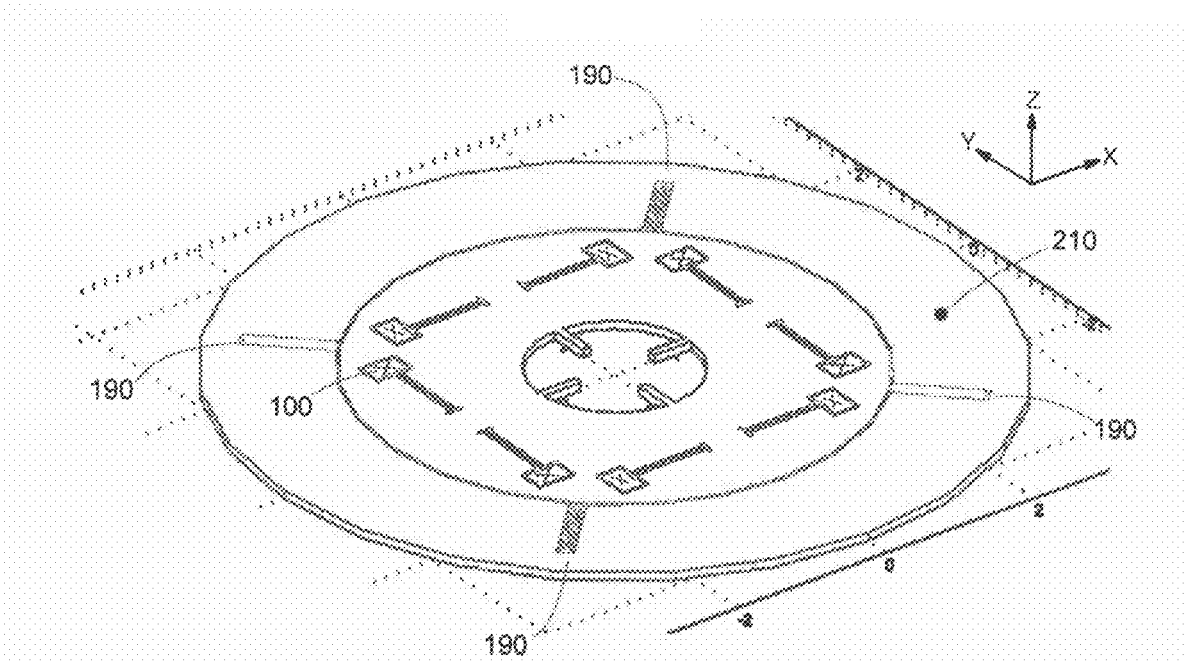
FIGS. 10a and 10b envision embodiment variants of an inertial sensor according to the invention.
Figure 10B:
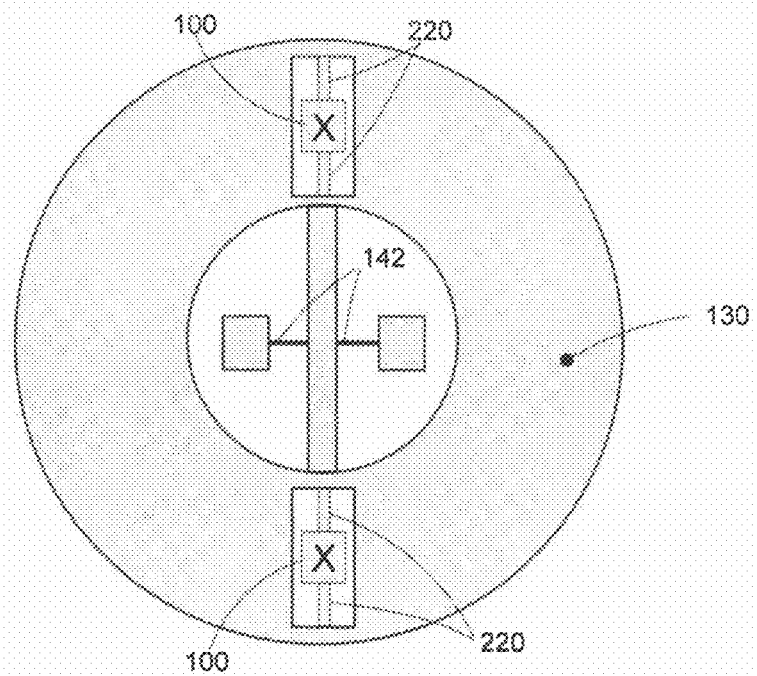

FIGS. 10*a* and 10*b* envision embodiment variants of an inertial sensor according to the invention on the basis of the following remarks:

- The first and second seismic masses, or in other words outer and intermediate rings 110 and 120 respectively may optionally be merged into the same ring 210 forming the excitation element. There are used outer springs that are flexible both in the plane and out of plane, or this ring is not anchored directly to the substrate, as shown in FIG. 10*a*, or mass 210 is supported by way of springs r190, which join it only to detection mass 130. This single mass 120 then acquires three degrees of freedom in rotation around the X, Y and Z axes. The only remaining anchoring points are those of central ring 130.

This solution may be applied for a single detection axis X or Y. In this case it is sufficient to block one of the following degrees of freedom, X or Y respectively. As shown in FIG. 10*b*, it is possible to block one detection mode by substituting springs made of torsion beams 220 for the anchoring springs of central ring 130 described in the foregoing.

- The detection gauges are advantageously connected to the third mass, central ring 130, as close as possible to the vertical plane (according to 2) containing the axis of rotation of this mass, so that they are subjected as much as possible to tensile/compressive strains and as little as possible to flexural strains.

- Strain gauges 142 are advantageously constructed at the same time as the connections by which their contacts may be led out and at the same time as possible electrostatic counter-reaction electrodes.

- As already mentioned in FIG. 9, it may be worthwhile to make certain mechanical parts locally thinner: for example, the vertical springs, to reduce their stiffness.

FIGS. 11*a* to 11*f* describe a variant of the invention with three detection axes.

Figure 11A:
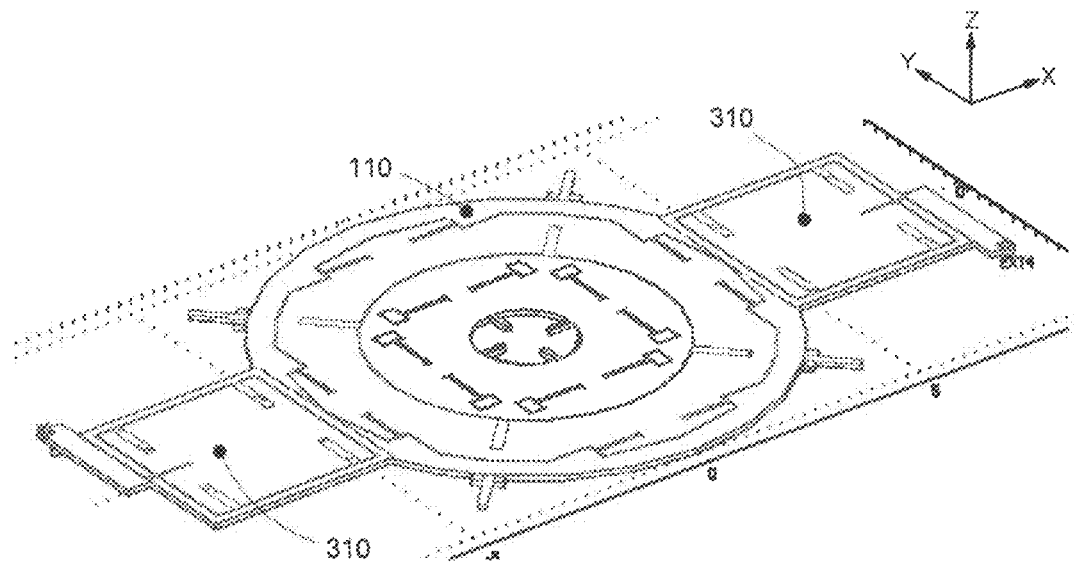
FIGS. 11a to 11f describe a variant of the invention with three detection axes.

As explained in particular in FIGS. 1 to 4, first mass 110 of the three masses of an inertial sensor according to the invention furnishes a movement in the XY plane and does not have any movement out of plane. As shown in FIG. 11*a*, it is therefore possible to bond thereto an additional mass 310, which will be set in vibration, for example in Y. Thus it is left with one degree of freedom in X. It will be capable of sensing a Coriolis force generated by a rotation around the Z axis.

This Coriolis force may be measured by any kind of detection method, especially by means of suspended piezoresistive gauges as described in the foregoing for detection in the X and/or Y axes.

The base structure with three masses comprising one mass that has a degree of freedom only in excitation and therefore no movement out of plane is particularly advantageous when it is hoped to produce a structure capable of measuring 3 axes, given that, by using this first mass for the excitation part of the measurement in Z, the risks of mechanical coupling between the X/Y axes on the one hand and the Z axis on the other are minimized.

Figure 11B:
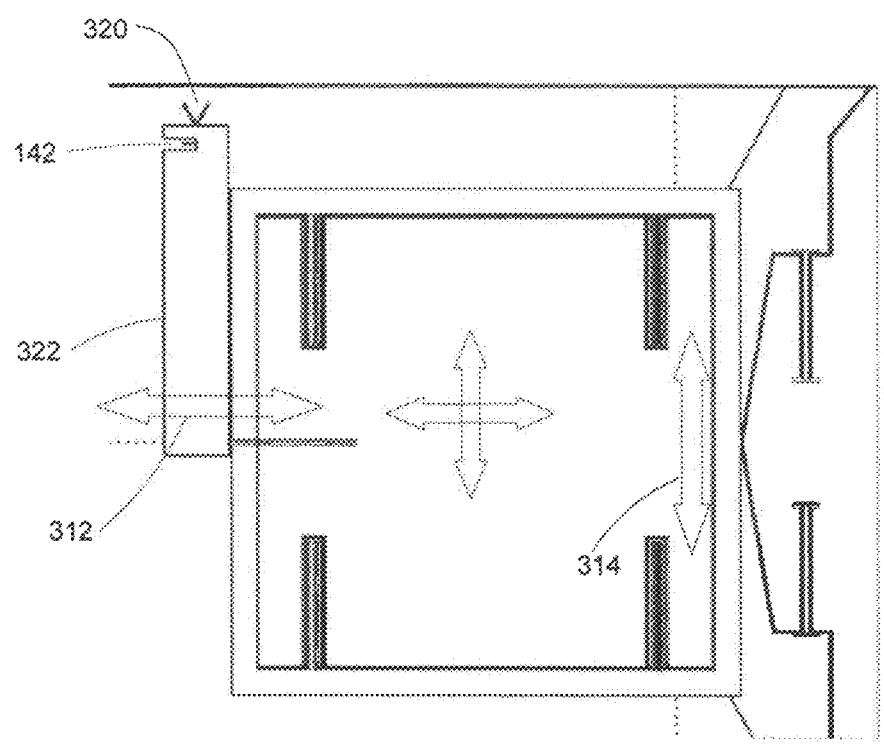
Figure 11C:
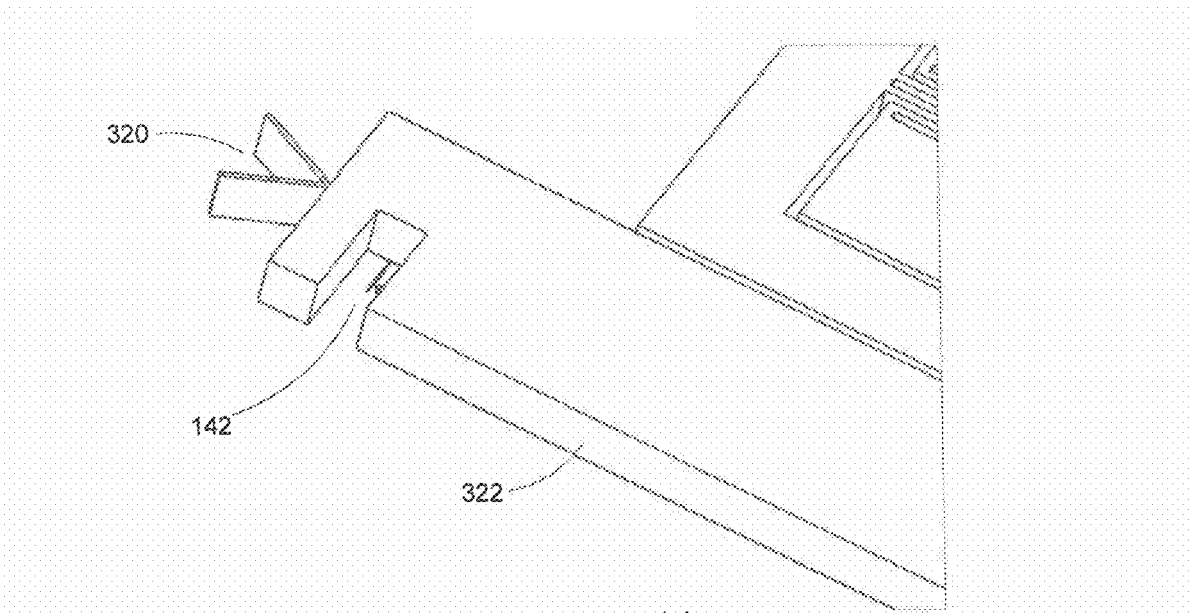

FIGS. 11*b* and 11*c* show an arrangement of a piezoresistive gauge 142 for detection of movements 312 generated by the Coriolis forces experienced by mass 310, whose excitation movements are applied in an orthogonal direction 314. The movements are detected around a pivot 320. Part 322 constitutes an arm for amplification of the movements to be detected.

When added in this way, the detection module of the Z axis is very sensitive to accelerations in X. To alleviate this problem, a differential measurement is made as shown in FIG. 11*a*, using a mass comprising two parts 310 excited in phase opposition, since they are on either side of disk 110. This makes it possible to distinguish the contribution of the Coriolis force (in phase opposition) from the acceleration (movement of two identical masses). The two parts of mass 310 are advantageously symmetric relative to the Z axis, which furthermore is advantageously the axis of symmetry of the other masses, including detection mass 130.

In this exemplary embodiment, the excitation movements in phase opposition are situated opposite the disk. When disposed as shown in FIGS. 11*b* and 11*c*, the two parts of the mass of the part sensitive to the Z axis are activated in phase opposition. It is possible to distinguish the contribution of acceleration (gauges deformed in phase opposition) from that of the Coriolis force (gauges deformed in phase).

Figure 11D:
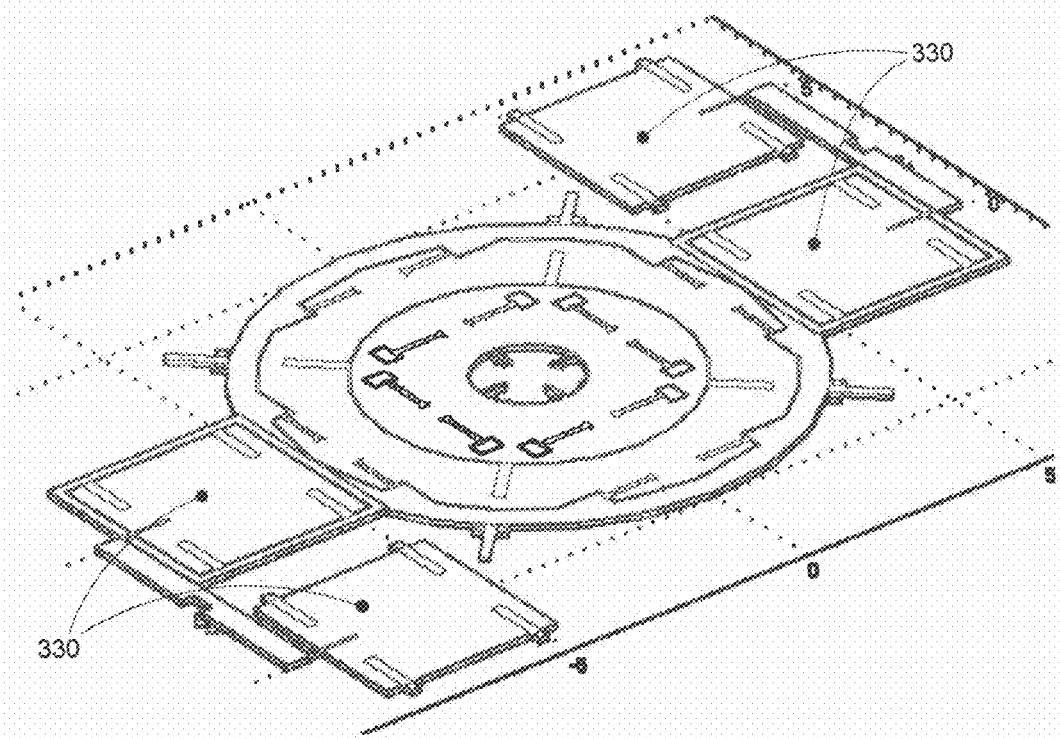
Figure 11E:
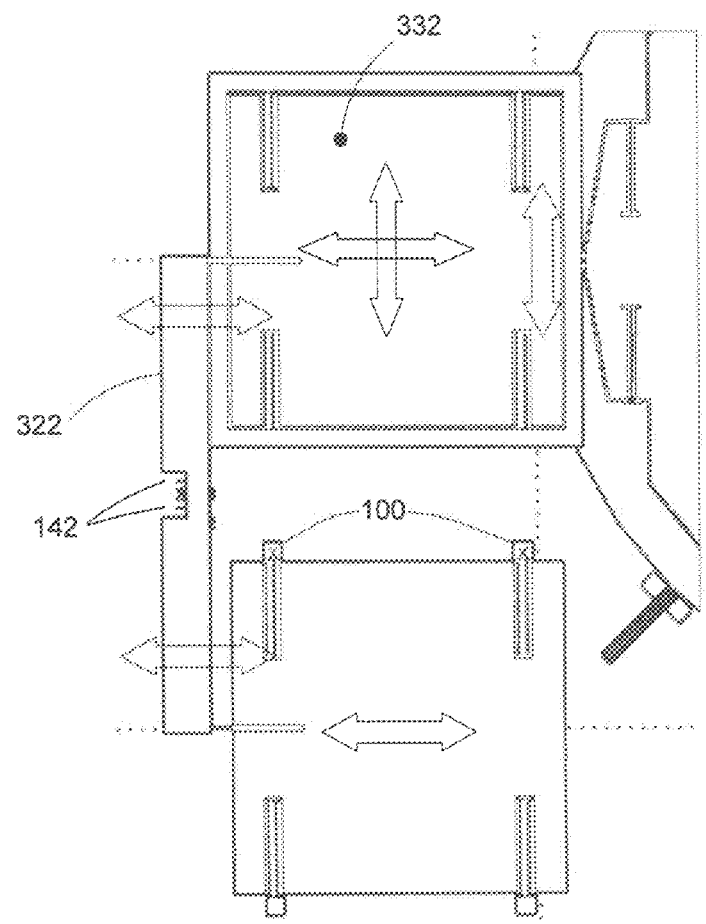
Figure 11F:
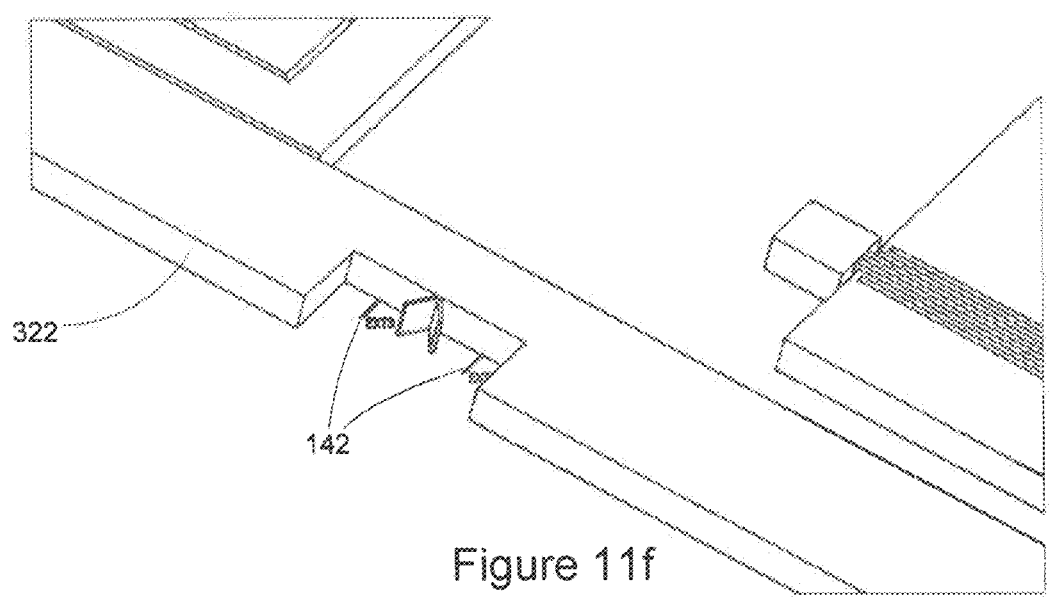

To make each structure less sensitive to accelerations, it is possible, as shown in FIGS. 11*d*, 11*e* and 11*f*, to construct a "false" double mass on each part, in order to counterbalance the force of acceleration on the detection mass and to equilibrate the structure in the X axis. In these two cases, the two parts of mass 310 for detection in the Z axis are each provided with two masses 330. A single portion of mass 332 is then in excitation movement (the other is anchored by anchoring points 100). The sensitivity to accelerations decreases with increasing rigidity of amplification arm 322 containing detection gauges 142.

In this exemplary embodiment, it will be possible to observe the presence of certain parasitic effects, although it is possible to eliminate their effects:

- The movement in excitation is not perfectly linear (rotational movement of a disk over an angle, albeit small), with the consequence that part of the movement will have the ability to be transmitted in X and to perturb the measurement. However, since this contribution is at a frequency double that of the Coriolis signal, it can be easily filtered.
- Another consequence is the presence of a centrifugal force proportional to the square of the velocity. Since it also makes a contribution at double frequency, it can also be filtered under the same conditions.

The structure is in equilibrium at rest (without excitation movement), but when one of the masses is excited, the position of its center of gravity relative to the pivot will be displaced and the two moments resulting from the forces of acceleration on the two masses 330 will no longer compensate exactly for one another. This will make a contribution proportional to the displacement, which, however, will be in quadrature with the Coriolis signal (proportional to the velocity), and so it will be possible to demodulate it from the Coriolis signal.

The invention is not limited to the embodiments described in the foregoing but extends to any embodiment in conformity with its spirit.

The invention claimed is:

1. An inertial rotary movement microsensor for detecting a rotational movement around what is referred to as an axis of rotation (X), provided with a part that is movable relative to a fixed part, the movable part comprising:
   an excitation mass configured to undergo an oscillating movement around what is referred to as an excitation axis (Z) by an exciter so as to generate a Coriolis force induced by the rotational movement,
   a detection mass kinematically connected to the excitation mass by a linkage configured to transmit the Coriolis force at least partly without transmitting the oscillating movement around the excitation axis (Z) at least partly, and having one degree of freedom in rotation around what is known as an oscillation axis (Y), perpendicular to the axis of rotation (X), and
   a detector configured to measure the Coriolis force transmitted to the detection mass,
   wherein the detector is provided with at least one strain gauge suspended between the detection mass and an anchoring part integral with the fixed part, and wherein the at least one strain gauge is connected to the detection mass at a height level in the excitation axis (Z) different from that of the oscillation axis (Y) of the detection mass.

2. The microsensor according to claim 1, wherein at least one strain gauge is a piezoresistive gauge.

3. The microsensor according to claim 1, wherein the fixed part is provided with a substrate from which all or part of the movable part is constructed, the strain gauge extending in a plane parallel to the plane of the substrate, in a direction parallel to the axis of rotation (X).

4. The microsensor according to claim 3, wherein the detection mass is superposed on the fixed part in the excitation axis (Z) and is provided with an inside face opposite one face of the fixed part, the strain gauge being located in the extension of the inside face.

5. The microsensor according to claim 1, provided with an intermediate movable mass connected to the excitation mass so as to be subjected at least partly to the oscillating movement around the excitation axis (Z) and to the Coriolis force, and connected to the detection mass so as to transmit the Coriolis force at least partly and to be movable in rotation integrally with the detection mass in its oscillation axis (Y).

6. The microsensor according to claim 1, wherein the strain gauge is suspended from the anchoring part integral with the fixed part by way of an individual electrical contact.

7. The microsensor according to claim 1, wherein the detection mass is provided with a hole, at the position of which there is suspended the at least one strain gauge.

8. The microsensor according to claim 7, wherein the detection mass exhibits axial symmetry in the excitation axis (Z), the hole being located at the center of the detection mass.

9. The microsensor according to claim 8, wherein the detection mass is provided with a series of beams provided with at least one beam projecting toward the inside of the hole and to which the strain gauge is connected.

10. The microsensor according to claim 9, wherein the beam is oriented in the oscillation axis (Y) of the detection mass.

11. The microsensor according to claim 10, wherein the detection mass is provided with a second strain gauge connected to the beam in symmetrical relationship with the first strain gauge relative to the oscillation axis (Y) of the detection mass.

12. The microsensor according to claim 9, wherein the series of beams includes a second beam to form a pair of beams comprising at least one strain gauge connected to the second beam, the said second beam and the said at least one gauge being symmetric respectively relative to the first beam and to the at least one strain gauge connected to the first beam, in the axis of symmetry of the detection mass.

13. The microsensor according to claim 1, wherein the excitation mass and the detection element are configured to generate and transmit a second Coriolis force induced by a rotational movement around a second axis of rotation (Y) perpendicular to the axis of rotation (X), the micro sensor being provided with a second detector configured to measure the second Coriolis force transmitted to the detection mass, the detection mass having one degree of freedom in rotation around a second axis (X) referred to as oscillation axis.

14. The microsensor according to claim 13, provided with an intermediate movable mass connected to the excitation mass so as to be subjected at least partly to the oscillating movement around the excitation axis (Z) and to the Coriolis force, and connected to the detection mass so as to transmit the Coriolis force at least partly and to be movable in rotation integrally with the detection mass in its oscillation axis (Y),
   wherein the intermediate mass has one degree of freedom in rotation around the second axis (X) referred to as oscillation axis.

15. The microsensor according to claim 13,
   wherein the detection mass is provided with a hole, at the position of which there is suspended the at least one strain gauge,
   wherein the detection mass exhibits axial symmetry in the excitation axis (Z), the hole being located at the center of the detection mass,
   wherein the detection mass is provided with a series of beams provided with at least one beam projecting toward the inside of the hole and to which the strain gauge is connected, and
   wherein the detection mass is provided with a second series of beams turned by 90° relative to the first series of beams around the point of intersection of the first and second oscillation axes (X, Y) of the detection mass, and wherein the second detector is provided with piezoresistive gauges turned by 90° relative to the piezoresistive gauges of the first detector around the point of intersection of the first and second oscillation axes (X, Y) of the detection mass.

16. The microsensor according to claim 1, wherein the excitation mass surrounds the detection mass.

17. The microsensor according to claim 1, provided with:
   an additional mass connected to the excitation mass so as to exhibit a vibration movement in a direction perpendicular to the excitation axis (Z) and so as to generate a Coriolis force induced by a rotational movement of the additional mass in the excitation axis (Z), and
   an additional detector configured to measure the Coriolis force induced by a rotational movement of the additional mass in the excitation axis (Z).

18. The microsensor according to claim 17, wherein the additional mass has two parts constructed symmetrically relative to the excitation axis (Z), the additional detector cooperating with the two parts of the additional mass to achieve a differential measurement of the Coriolis force induced by the rotational movement of the additional mass in the excitation axis.

19. The microsensor according to claim 18, wherein each part of the additional mass is provided with a portion configured to be subjected to the vibration movement and a portion anchored to the fixed part so that it is not subjected to the vibration movement, the two parts being connected by an arm, the additional detector being provided with at least one strain gauge on each arm.

20. The microsensor according to claim 1, consisting of a micro electromechanical system.

21. The microsensor according to claim 20, wherein the at least one strain gauge comprises a deposit of electrically conductive material having piezoresistive properties.

22. The microsensor according to claim 21, wherein the deposit of material is obtained by engraving in a layer of material, and at least one electrically conductive organ is also obtained by engraving in the said layer of material.

23. An inertial rotary movement microsensor for detecting a rotational movement around what is referred to as an axis of rotation (X), provided with a part that is movable relative to a fixed part, the movable part comprising:
   an excitation mass configured to undergo an oscillating movement around what is referred to as an excitation axis (Z) by an exciter so as to generate a Coriolis force induced by the rotational movement,
   a detection mass kinematically connected to the excitation mass by a linkage configured to transmit the Coriolis force at least partly without transmitting the oscillating movement around the excitation axis (Z) at least partly, and having one degree of freedom in rotation around what is known as an oscillation axis (Y), perpendicular to the axis of rotation (X),
   a detector configured to measure the Coriolis force transmitted to the detection mass, wherein the detector is provided with at least one strain gauge suspended between the detection mass and an anchoring part integral with the fixed part,
   an additional mass connected to the excitation mass so as to exhibit a vibration movement in a direction perpendicular to the excitation axis (Z) and so as to generate a Coriolis force induced by a rotational movement of the additional mass in the excitation axis (Z), and
   an additional detector configured to measure the Coriolis force induced by a rotational movement of the additional mass in the excitation axis (Z).

24. The microsensor according to claim 23, wherein the additional mass has two parts constructed symmetrically relative to the excitation axis (Z), the additional detector cooperating with the two parts of the additional mass to achieve a differential measurement of the Coriolis force induced by the rotational movement of the additional mass in the excitation axis.

25. The microsensor according to claim 24, wherein each part of the additional mass is provided with a portion configured to be subjected to the vibration movement and a portion anchored to the fixed part so that it is not subjected to the vibration movement, the two parts being connected by an arm, the additional detector being provided with at least one strain gauge on each arm.

* * * * *